United States Patent [19]

Riepl

[11] Patent Number: 5,295,589
[45] Date of Patent: Mar. 22, 1994

[54] GRATE FOR RECEIVING DISHWARE

[75] Inventor: Alfons Riepl, Uffing, Fed. Rep. of Germany

[73] Assignee: Convotherm Elektrogeräte GmbH, Untereglfing, Fed. Rep. of Germany

[21] Appl. No.: 877,298

[22] Filed: May 1, 1992

[30] Foreign Application Priority Data

May 2, 1991 [DE] Fed. Rep. of Germany ....... 4114352

[51] Int. Cl.⁵ .............................................. A47F 7/00
[52] U.S. Cl. ...................................... 211/41; 211/181
[58] Field of Search ........................... 211/41, 181, 189

[56] References Cited

U.S. PATENT DOCUMENTS

| 1,453,437 | 5/1923 | Burnham | 211/181 X |
| 2,119,442 | 5/1938 | Robinson | 211/181 X |
| 3,038,630 | 6/1962 | Clark | 211/181 X |
| 3,517,606 | 6/1970 | Myles et al. | 211/181 X |

FOREIGN PATENT DOCUMENTS

| 1945682 | 8/1966 | Fed. Rep. of Germany . |
| 2037481 | 2/1972 | Fed. Rep. of Germany . |
| 7235591 | 9/1972 | Fed. Rep. of Germany . |
| 2220154 | 11/1972 | Fed. Rep. of Germany . |
| 440596 | 12/1967 | Switzerland . |

Primary Examiner—Robert W. Gibson, Jr.
Attorney, Agent, or Firm—McAulay, Fisher, Nissen, Goldberg & Kiel

[57] ABSTRACT

A grate for receiving dishware comprises a base frame and parallel grate bars which are aligned in one direction and constructed in an undulating manner. The base rims of dishware can hook on to the ridges formed by the undulation crests so that they are held on the grate securely to a great extent.

9 Claims, 4 Drawing Sheets

GRATE FOR RECEIVING DISHWARE

BACKGROUND OF THE INVENTION a) Field of the Invention

The invention is directed to a grate for receiving dishware, particularly in movable racks or rack carts, having a base frame and grate bars extending in one direction.

Background Art

Grates of this type have grate bars extending in a straight line. Since these grate bars are either made of stainless steel or chromed, they have a relatively smooth surface and in view of the fact that all of the grate bars of a grate lie in the same plane they have the disadvantage that dishware deposited on them can easily slip off when acted upon by slight forces, which occurs particularly when grates of this type are used in displaceable or movable racks or rack carts.

OBJECT AND SUMMARY OF THE INVENTION

It is a primary object of the invention to construct a grate of the type mentioned above in such a way that dishware having a base rim can be deposited so as to be relatively secure against slippage and can be transported together with the grate.

This object is met in accordance with the invention for receiving dishware, particularly in movable racks and rack carts, comprising a base frame and grate bars extending in one direction wherein the grate bars are constructed in an undulating manner.

Further in accordance with the invention, ridges and grooves are formed by the undulating shape so that the grate surface is no longer planar. The base rim of a piece of dishware can engage in these grooves or depressions and can be supported at the adjoining ridges so that the piece of dishware is kept relatively secure against slippage. It must be ensured that the ridges formed by the wave crests are not too small, i.e., that the undulations do not rise at an angle which is too flat.

Still further in accordance with the invention, good results can be achieved with respect to protection against slippage if the wavelength of the grate bars is shorter than the distance between two grate bars. There is accordingly a certain correspondence between the distance between the grate bars and the wavelength. Since the grate bars are normally arranged at intervals between one and three centimeters, this determines the wavelength to a great extent so that it can be specially adapted to the type of dishware which is predominantly used.

Favorable results with respect to the protection against slippage is achieved if the wavelength of the grate bars is between one third and one tenth of the diameter of the grate bars according to another construction of the invention. This results in a pattern of ridges, as seen along the grate surface, providing a sufficient number of ridges for a wide range of diameters of base rims of the dishware which can rest against these ridges so as to prevent the piece of dishware from slipping off.

In another aspect of the present invention, in order to increase the resistance against slippage, i.e., to achieve the most secure hooking of the pieces of dishware on the grate, the undulations of the grate bars are constructed in the manner of saw teeth with straight-line edges and narrow bending radii at the ridges and grooves of the undulations. The resistance in the direction of the grate bars is accordingly greater than if the undulations were constructed in a smoother shape corresponding to a sine-shaped configuration.

The edge angles can be identical to one another in still another aspect of the invention.

There is an improved hooking between the grate and dishware deposited thereon when the undulations of the grate bars are constructed in the manner of saw teeth with variously inclined edges and adjacent grate bars are arranged with oppositely aligned edges in accordance with another aspect of the invention. This results in saw teeth which drop relatively abruptly in one direction which offers favorable support surfaces for the base rims of the dishware. Since the other edge is substantially flatter because of this, the disadvantage in these flat edges is avoided in that the saw teeth of adjacent grate bars are directed toward one another, i.e., the steep edges are arranged substantially opposite one another so that there are gently dropping edges and sharply dropping edges from one grate bar to the next in both directions of the grate bars.

The undulations of the adjacent grate bars can be constructed so as to be parallel or offset relative to one another in a particular form of the invention.

It is recommended in a further aspect of the invention that the grate bars be arranged transversely relative to the movement direction of the grate, since the ridges situated transversely relative to the longitudinal direction of the undulations, i.e., transversely relative to the grate bar direction, are steeper than those in the direction of the grate bar, so that there is a greater resistance to slippage.

For a better understanding of the present invention, reference is made to the following description and accompanying drawings while the scope of the invention will be pointed out in the appended claims.

DESCRIPTION OF PREFERRED EMBODIMENTS

A grate for receiving dishware is shown in all of the FIGS. 1 to 4 and is designated in its entirety by 1. Each grate comprises a base frame 2 and grate bars 3 fastened thereon. These grates are provided particularly for rack carts in which a plurality of grates are supported one above the other, dishware being deposited and transported on the latter. The longitudinal axis of the grate bars is arranged in these grates transversely relative to the movement direction. All of the grate bars 3 are constructed in a undulating manner so that a certain hooking occurs between the base rims of the individual dishware and the ridges of the grate, which hooking prevents the dishware deposited on the grates from slipping off.

Figure 1:
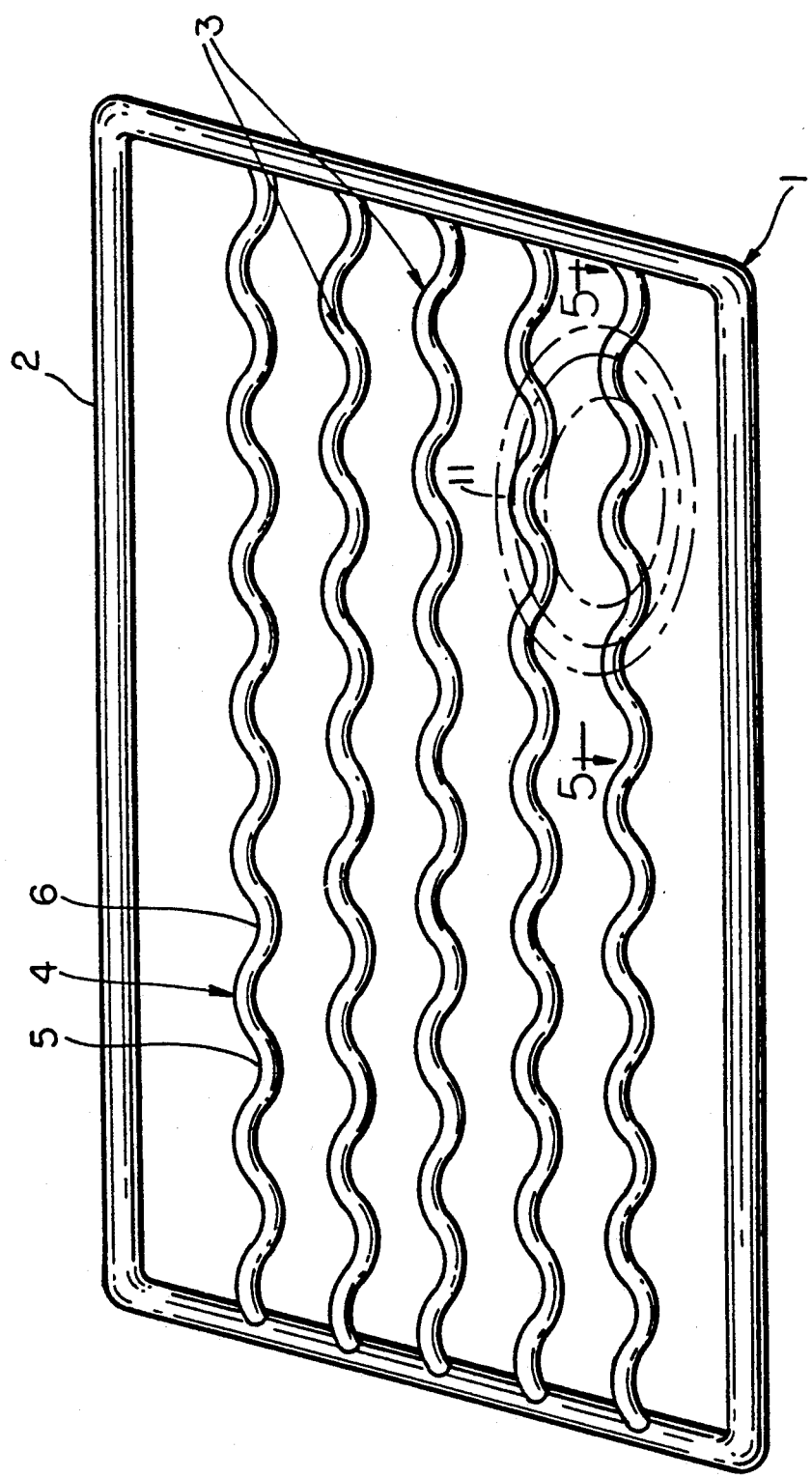
FIG. 1 shows a first embodiment form of a grate.

In the embodiment form according to FIG. 1, the undulations 4 which extend from one depression 5 to the next depression 6 are constructed in a substantially sinusoidal shape, wherein the distance between the individual grate bars 3 is less than that of the wavelength, i.e., corresponds to the distance between points 5 and 6. The undulations of the grate bars are formed parallel to one another.

Figure 2:
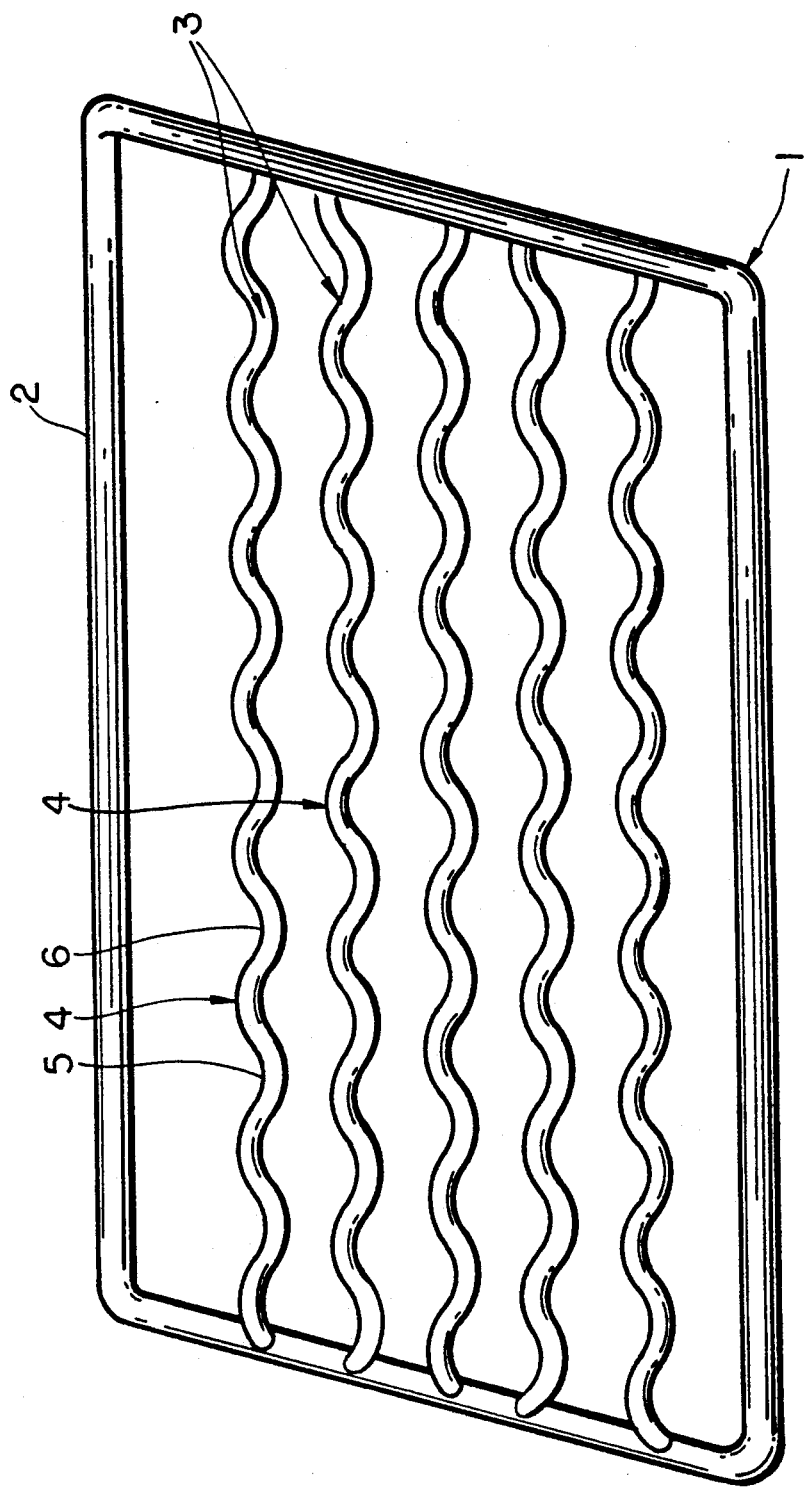
FIG. 2 shows a modification of the embodiment form according to FIG. 1.

In the embodiment form according to FIG. 2, the grate bars are constructed in the same manner as in the embodiment form according to FIG. 1, but the undulations are arranged so as to be offset relative to one another so that the ridges of the wave crests do not lie in a line.

Figure 3:
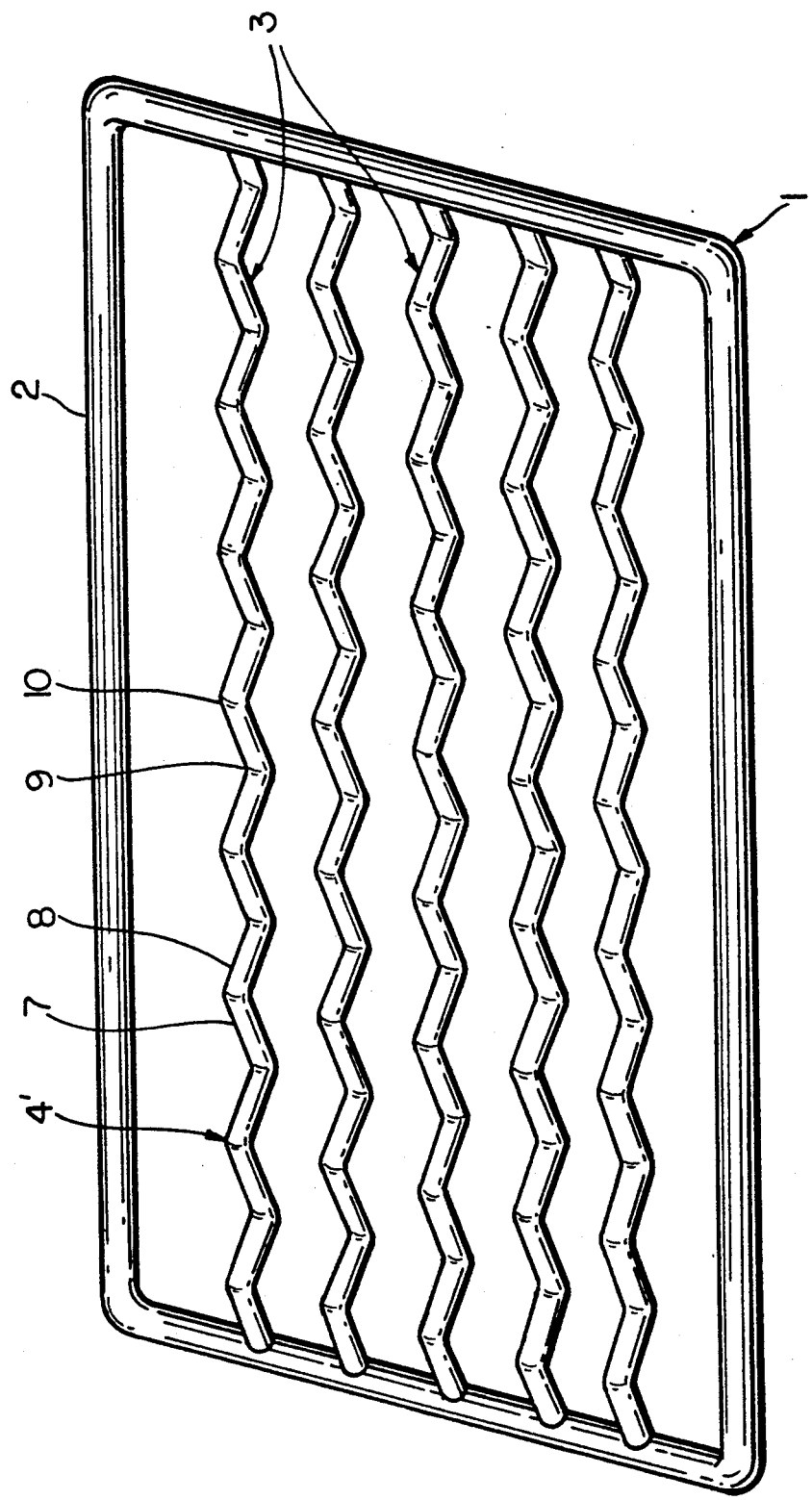
FIG. 3 shows another construction of a grate.

In the embodiment form according to FIG. 3, the undulations 4' have straight-line edges 7 and 8, wherein the depressions 9 of the undulations and the ridges 10 of the undulations are formed by rounded portions with a smaller diameter so that relatively abrupt ridges occur at which the base rims of the dishware can hang to some extent.

Figure 4:
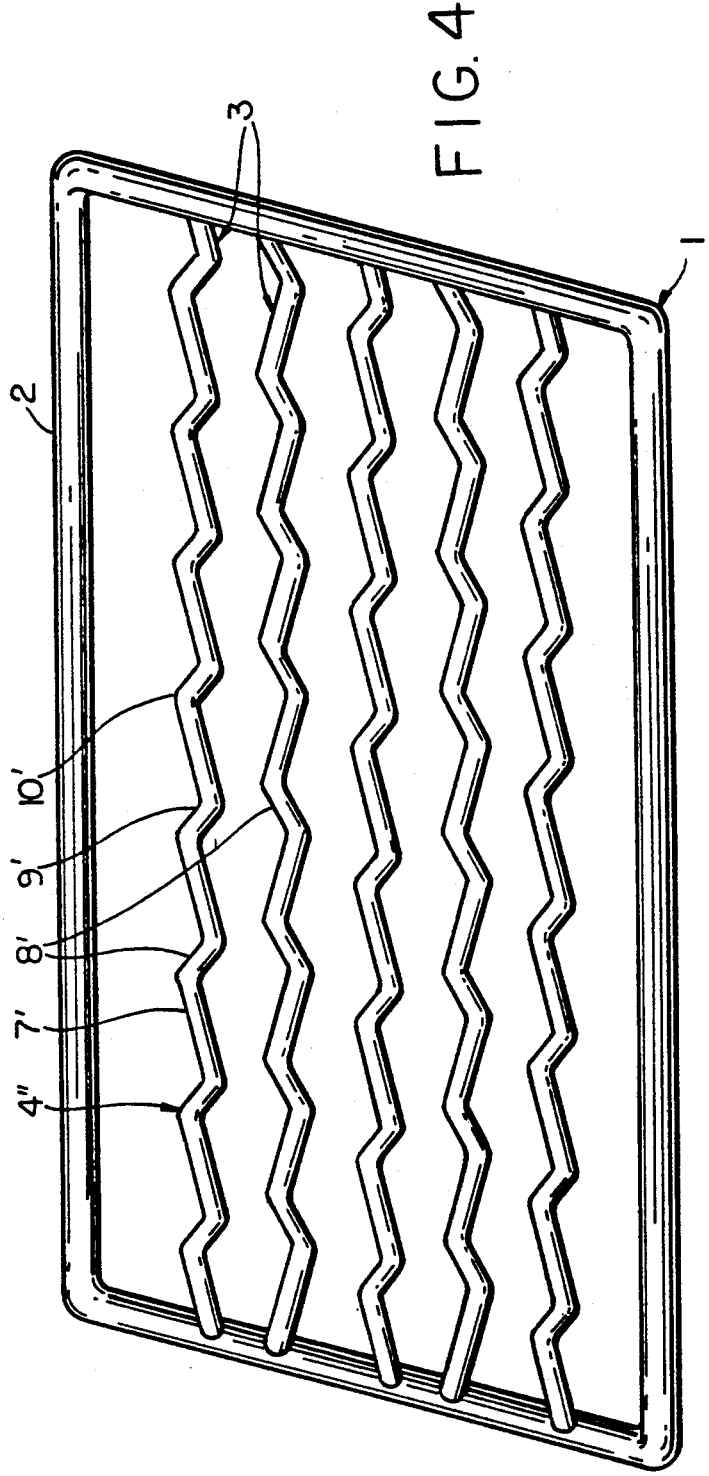
FIG. 4 shows a modification of the grate according to FIG. 3.

In the embodiment form according to FIG. 4, the modification consists in that the undulations 4" of the grate bars 3 which are constructed in the manner of saw teeth have straight-line edges 7' and 8' inclined at different angles, the edges 8' being steeper than the edges 7'. The adjacent grate bars are arranged opposite one another, i.e., the steep grate edges 8' of the adjacent grate bars face one another, so that there is no preferred direction in this grate.

This is achieved in that grate bars of identical construction are fastened in alternating alignment at the base frame 2. In this way a grate is formed in which particularly abrupt projections are formed in both opposing directions of the grate bars, which projections are characterized by steeply dropping edges 8'. The ridges and depressions of the undulations 9' and 10', respectively, are also formed by narrow bending radii in this embodiment form.

Figure 5:
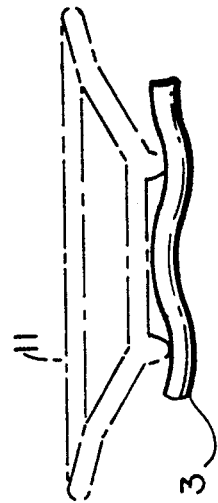
FIG. 5 illustrates a cross-sectional view of a portion of the grate of FIG. 1 with a dish disposed thereon.

FIG. 1 and FIG. 5 also illustrate the way a dish 11 is disposed on the grate 1.

While the foregoing description and drawings represent the preferred embodiments of the present invention, it will be obvious to those skilled in the art that various changes and modifications may be made therein without departing from the true spirit and scope of the present invention.

What is claimed is:

1. A grate for receiving dishware, for use in movable racks and rack carts, the dishware having a base rim on an underside, said grate comprising:
   (a) a base frame and
   (b) a plurality of grate bars connected to said base frame, said bars being constructed in an undulating manner having crests and valleys, said valleys receiving the base rim of the dishware to prevent the dishware from slipping while horizontally positioned on said grate.

2. The grate of claim 1 wherein the distance between adjacent crests of said grate bars defines a wavelength and a first distance separates two adjacent grate bars, said wavelength being shorter than said first distance.

3. The grate of claim 2 wherein said grate bars have a diameter, said wavelength being defined by the equation:

$$D/10 \leq \gamma \leq D/3,$$

wherein D is said diameter and $\gamma$ is said wavelength.

4. The grate of claim 1 wherein said grates are shaped as saw-toothed waveforms, said crests and valleys having narrow bending radii.

5. The grate of claim 4 wherein said crests and valleys are formed by inclined edges defined by edge angles, said edge angles being identical for each one of said plurality of grate bars.

6. The grate of claim 5 wherein said edge angles are different for each one of said plurality of grate bars and wherein adjacent grate bars are arranged with adjacent inclined edges opposing one another.

7. The grate of claim 1 wherein said grate crests and valleys of adjacent grate bars are aligned with one another.

8. The grate of claim 1 wherein said crests and valleys of adjacent grate bars are offset from one another.

9. The grate of claim 1 wherein said grate bars are positioned horizontal to the movement of the movable racks or the rack cart.

* * * * *